United States Patent
Noh et al.

(10) Patent No.: US 11,063,699 B2
(45) Date of Patent: Jul. 13, 2021

(54) TRANSPORT BLOCK TRANSMISSION METHOD AND TRANSMISSION DEVICE

(71) Applicant: LG ELECTRONICS INC., Seoul (KR)

(72) Inventors: Kwangseok Noh, Seoul (KR); Bonghoe Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/484,102

(22) PCT Filed: Feb. 6, 2018

(86) PCT No.: PCT/KR2018/001577
§ 371 (c)(1),
(2) Date: Aug. 6, 2019

(87) PCT Pub. No.: WO2018/143772
PCT Pub. Date: Aug. 9, 2018

(65) Prior Publication Data
US 2020/0153549 A1 May 14, 2020

Related U.S. Application Data

(60) Provisional application No. 62/455,581, filed on Feb. 6, 2017.

(51) Int. Cl.
*H04L 1/00* (2006.01)
*H04L 1/06* (2006.01)

(52) U.S. Cl.
CPC .......... *H04L 1/0063* (2013.01); *H04L 1/0003* (2013.01); *H04L 1/0071* (2013.01); *H04L 1/0643* (2013.01)

(58) Field of Classification Search
CPC ....... H04L 1/0643; H04L 1/0061; H04L 1/00; H04L 1/0045; H04L 1/0009; H04L 1/0003; H04L 1/0071; H04L 1/0015; H04L 1/0063; H04L 1/0041
See application file for complete search history.

(56) References Cited

U.S. PATENT DOCUMENTS

2010/0303016 A1* 12/2010 Jin ................... H04L 27/0008
370/328
2016/0234812 A1 8/2016 Kim et al.
2016/0294512 A1 10/2016 Noh et al.

OTHER PUBLICATIONS

Ericsson, Investigation of LDPC Codes with CRC Attachment, R1-1700109, 3GPP TSG RAN WG1 AH_NR Meeting, Spokane, USA, Jan. 10, 2017.*
PCT International Application No. PCT/KR2018/001577, Written Opinion of the International Searching Authority dated May 8, 2018, 19 pages.

(Continued)

*Primary Examiner* — Yemane Mesfin
*Assistant Examiner* — Henry Baron
(74) *Attorney, Agent, or Firm* — Lee, Hong, Degerman, Kang & Waimey PC

(57) ABSTRACT

A transmission device in a wireless communication system attaches a cyclic redundancy check (CRC) code having a predetermined length to a code block (CB) acquired from a transport block (TB). The predetermined length according to the present invention depends on a code rate associated with the TB.

8 Claims, 10 Drawing Sheets

(56) References Cited

OTHER PUBLICATIONS

Ericsson, "Investigation of LDPC codes with CRC attachment", 3GPP TSG RAN WG1 AH NR Meeting, R1-1700109, Jan. 2017, 6 pages.
Nokia, et al., "CRC attachment for eMBB data", 3GPP TSG RAN WG1 NR Ad-Hoc Meeting, R1-1701030, Jan. 2017, 4 pages.
Nokia, et al., "False alarm rate of LDPC decoding and CRC requirement", 3GPP TSG RAN WG1 Meeting #86bis, R1-1609588, Oct. 2016, 6 pages.

* cited by examiner (a)                    (b)

TRANSPORT BLOCK TRANSMISSION METHOD AND TRANSMISSION DEVICE

CROSS-REFERENCE TO RELATED APPLICATIONS

This application is the National Stage filing under 35 U.S.C. 371 of International Application No. PCT/KR2018/001577, filed on Feb. 6, 2018, which claims the benefit of U.S. Provisional Application No. 62/455,581, filed on Feb. 6, 2017, the contents of which are all hereby incorporated by reference herein in their entireties.

TECHNICAL FIELD

The present invention relates to a wireless communication system and, more particularly, to a method and apparatus for transmitting a transport block.

BACKGROUND ART

With appearance and spread of machine-to-machine (M2M) communication, machine type communication (MTC) and a variety of devices such as smartphones and tablet Personal Computers (PCs) and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

As more communication devices have demanded higher communication capacity, there has been necessity of enhanced mobile broadband (eMBB) relative to legacy radio access technology (RAT). In addition, massive machine type communication (mMTC) for providing various services anytime and anywhere by connecting a plurality of devices and objects to each other is one main issue to be considered in future-generation communication.

Further, a communication system to be designed in consideration of services/UEs sensitive to reliability and latency is under discussion. The introduction of future-generation RAT has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed. In other words, as the density of nodes and/or the density of UEs increases, a method of efficiently using high-density nodes or high-density UEs for communication is needed.

With advances in technology, overcoming delay or latency is emerging as an important issue. Applications, performance of which remarkably depends on delay/latency, are increasing. Therefore, a method of further reducing delay/latency in a legacy system is needed.

With development of technologies, overcoming delay or latency has become an important challenge. Applications whose performance critically depends on delay/latency are increasing. Accordingly, a method to reduce delay/latency compared to the legacy system is demanded.

In addition, as technology has developed, using a frequency band which has conventionally not been used is under discussion. Since a newly introduced frequency band differs in characteristics from a legacy frequency band, it is difficult to apply legacy communication technology to the new frequency band. Accordingly, communication technology suitable for the new frequency band used for communication needs to be introduced.

The technical objects that can be achieved through the present invention are not limited to what has been particularly described hereinabove and other technical objects not described herein will be more clearly understood by persons skilled in the art from the following detailed description.

Technical Solution

In a wireless communication system, a transmitting device attaches a cyclic redundancy check (CRC) code of a specific length to a code block (CB) obtained from a transport block (TB). In the present invention, the specific length depends on a code rate for the TB.

According to an aspect of the present invention, provided herein is a method of transmitting a transport block (TB) by a transmitting device in a wireless communication system. The method includes: attaching a TB cyclic redundancy check (CRC) code to the TB to generate a TB CRC-attached TB; segmenting the TB CRC-attached TB into a plurality of code blocks (CBs); attaching a CB CRC of a specific length to each of the plural CBs to generate CB CRC-attached CBs; encoding the CB CRC-attached CB s to generate encoded CBs; and transmitting the encoded CBs to a receiving device, The specific length depends on a code rate for the TB.

In another aspect of the present invention, provided herein is a transmitting device for transmitting a transport block (TB) in a wireless communication system. The transmitting device includes: a radio frequency (RF) unit, and a processor configured to control the RF unit. The processor is configured to: attach a TB cyclic redundancy check (CRC) code to the TB to generate a TB CRC-attached TB; segment the TB CRC-attached TB into a plurality of code blocks (CBs); attach a CB CRC of a specific length to each of the plural CBs to generate CB CRC-attached CBs; encode the CB CRC-attached CBs to generate encoded CBs; and control the RF unit to transmit the encoded CBs to a receiving device. The specific length depends on a code rate for the TB.

In each aspect of the present invention, the CB CRC-attached CBs may be encoded using a low-density parity check (LDPC) code.

In each aspect of the present invention, code rate information indicating the code rate may be transmitted to the receiving device.

In each aspect of the present invention, the code rate information may be a modulation and coding scheme (MCS) index.

In each aspect of the present invention, the specific length may be small as the code rate is low.

The above technical solutions are merely some parts of the examples of the present invention and various examples into which the technical features of the present invention are incorporated can be derived and understood by persons skilled in the art from the following detailed description of the present invention.

Advantageous Effects

According to example(s) of the present invention, uplink/downlink signals can be efficiently transmitted/received. Therefore, overall throughput of a radio communication system can be improved.

According to an embodiment of the present invention, delay/latency occurring in a process of communication between a user equipment and a base station may be lowered.

With development of smart devices, small volumes of data may be efficiently transmitted/received or less frequently generated data may be efficiently transmitted/received.

According to example(s) of the present invention, delay/latency occurring during communication between a user equipment and a base station may be reduced.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate examples of the invention and together with the description serve to explain the principle of the invention.

MODE FOR CARRYING OUT THE INVENTION

Figure 1:
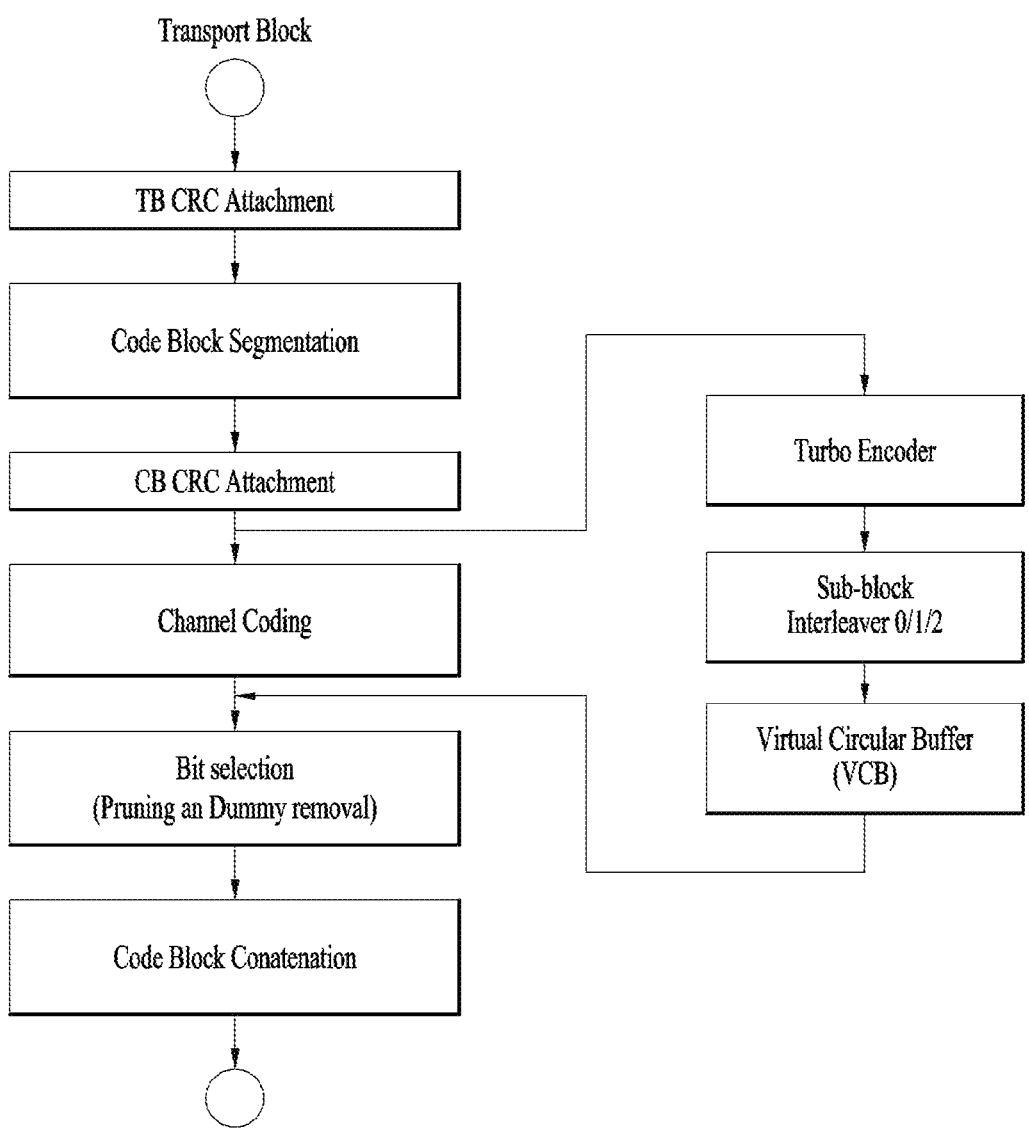
FIG. 1 illustrates a transport block processing procedure in an LTE/LTE-A system.

Reference will now be made in detail to the exemplary examples of the present invention, examples of which are illustrated in the accompanying drawings. The detailed description, which will be given below with reference to the accompanying drawings, is intended to explain exemplary examples of the present invention, rather than to show the only examples that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP based communication system, e.g. LTE/LTE-A, NR. However, the technical features of the present invention are not limited thereto. For example, although the following detailed description is given based on a mobile communication system corresponding to a 3GPP LTE/LTE-A/NR system, aspects of the present invention that are not specific to 3GPP LTE/LTE-A/NR are applicable to other mobile communication systems.

In examples of the present invention described below, the expression that a device "assumes" may mean that a subject which transmits a channel transmits the channel in accordance with the corresponding "assumption". This may also mean that a subject which receives the channel receives or decodes the channel in a form conforming to the "assumption", on the assumption that the channel has been transmitted according to the "assumption".

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Particularly, a BS of a UTRAN is referred to as a Node-B, a BS of an E-UTRAN is referred to as an eNB, and a BS of a new radio access technology network is referred to as an gNB. Herein, for convenience of description, a BS will be referred to as an eNB regardless of type or version of communication technology.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In the 3GPP based communication system, the UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node.

Meanwhile, a 3GPP based communication system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP communication standards use the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency is the same as a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A S cell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP based communication standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both an eNB and a UE. For example, a cell-specific RS (CRS), a UE-specific RS (UE-RS), a positioning RS (PRS), and channel state information RS (CSI-RS) may be defined as DL RSs. Meanwhile, the 3GPP based communication standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

For terms and technologies which are not described in detail in the present invention, reference can be made to the standard document of 3GPP LTE/LTE-A, for example, 3GPP TS 36.211, 3GPP TS 36.212, 3GPP TS 36.213, 3GPP TS 36.321, and 3GPP TS 36.331 and the standard document of 3GPP NR, for example, 3GPP TS 38.xxx. In addition, as to polar codes and the principle of encoding and decoding using the polar codes, reference may be made to 'E. Arikan, "Channel Polarization: A Method for Constructing Capacity-Achieving Codes for Symmetric Binary-Input Memoryless Channels," in IEEE Transactions on Information Theory, vol. 55, no. 7, pp. 3051-3073, July 2009'.

As more communication devices have demanded higher communication capacity, there has been necessity of enhanced mobile broadband relative to legacy radio access technology (RAT). In addition, massive machine type communication for providing various services irrespective of time and place by connecting a plurality of devices and objects to each other is one main issue to be considered in future-generation communication. Further, a communication system design in which services/UEs sensitive to reliability and latency are considered is under discussion. The introduction of future-generation RAT has been discussed by taking into consideration enhanced mobile broadband communication, massive MTC, ultra-reliable and low-latency communication (URLLC), and the like. In current 3GPP, a study of the future-generation mobile communication system after EPC is being conducted. In the present invention, the corresponding technology is referred to as a new RAT (NR) or 5G RAT, for convenience.

An NR communication system demands that much better performance than a legacy fourth generation (4G) system be supported in terms of data rate, capacity, latency, energy consumption, and cost. Accordingly, the NR system needs to make progress in terms of bandwidth, spectrum, energy, signaling efficiency, and cost per bit. NR needs to use efficient waveforms in order to satisfy these requirements.

FIG. 1 illustrates a transport block processing procedure in an LTE/LTE-A system.

In order for a receiving side to correct errors that a channel experiences, a transmitting side encodes information using a forward error correction code and then transmits the encoded information. The receiving side demodulates a received signal and decodes the error correction code to thereby recover the information transmitted by the transmitting side. In this decoding procedure, errors in the received signal caused by a channel are corrected.

Data arrives at a coding block in the form of a maximum of two transport blocks every transmission time interval (TTI) in each DL/UL cell. The following coding steps may be applied to each transport block of the DL/UL cell:
   cyclic redundancy check (CRC) attachment to a transport block;
   code block segmentation and CRC attachment to a code block;
   channel coding;
   rate matching; and
   code block concatenation.

Although various types of error correction codes are available, a turbo code has mainly been used in a legacy LTE/LTE-A system. The turbo code is implemented by a recursive systematic convolution encoder and an interleaver. For actual implementation of the turbo code, an interleaver is used to facilitate parallel decoding and quadratic polynomial permutation (QPP) is a kind of interleaving. It is known that a QPP interleaver maintains good performance only for a data block of a specific size. It is known that performance of the turbo code increases with a larger data block size. In an actual communication system, a data block of a predetermined size or larger is divided into a plurality of smaller data blocks and then is encoded, to facilitate actual implementation of coding. The smaller data blocks are called code blocks. While the code blocks are generally of the same size, one of the code blocks may have a different size due to a limited size of the QPP interleaver. Error correction coding is performed on each code block of a predetermined interleaver size and then interleaving is performed to reduce the impact of burst errors that are generated during transmission over a radio channel. The error-corrected and interleaved code block is transmitted by being mapped to an actual radio resource. The amount of radio resources used for actual transmission is designated. Thus, the encoded code blocks are rate-matched to the amount of the radio resources. In general, rate matching is performed through puncturing or repetition.

That is, in the LTE/LTE-A system, data to be transmitted is encoded using channel coding with a specific code rate (e.g., 1/3). If the number of bits capable of being transmitted is different from the number of coded bits, the code rate of the data to be transmitted is adjusted through a rate matching procedure including puncturing and repetition. When the turbo code is used as a channel code in the LTE/LTE-A system, a procedure of performing channel coding and rate-matching on each code block in the transport block processing procedure as illustrated in FIG. 1 is illustrated in FIG. 2.

Figure 2:
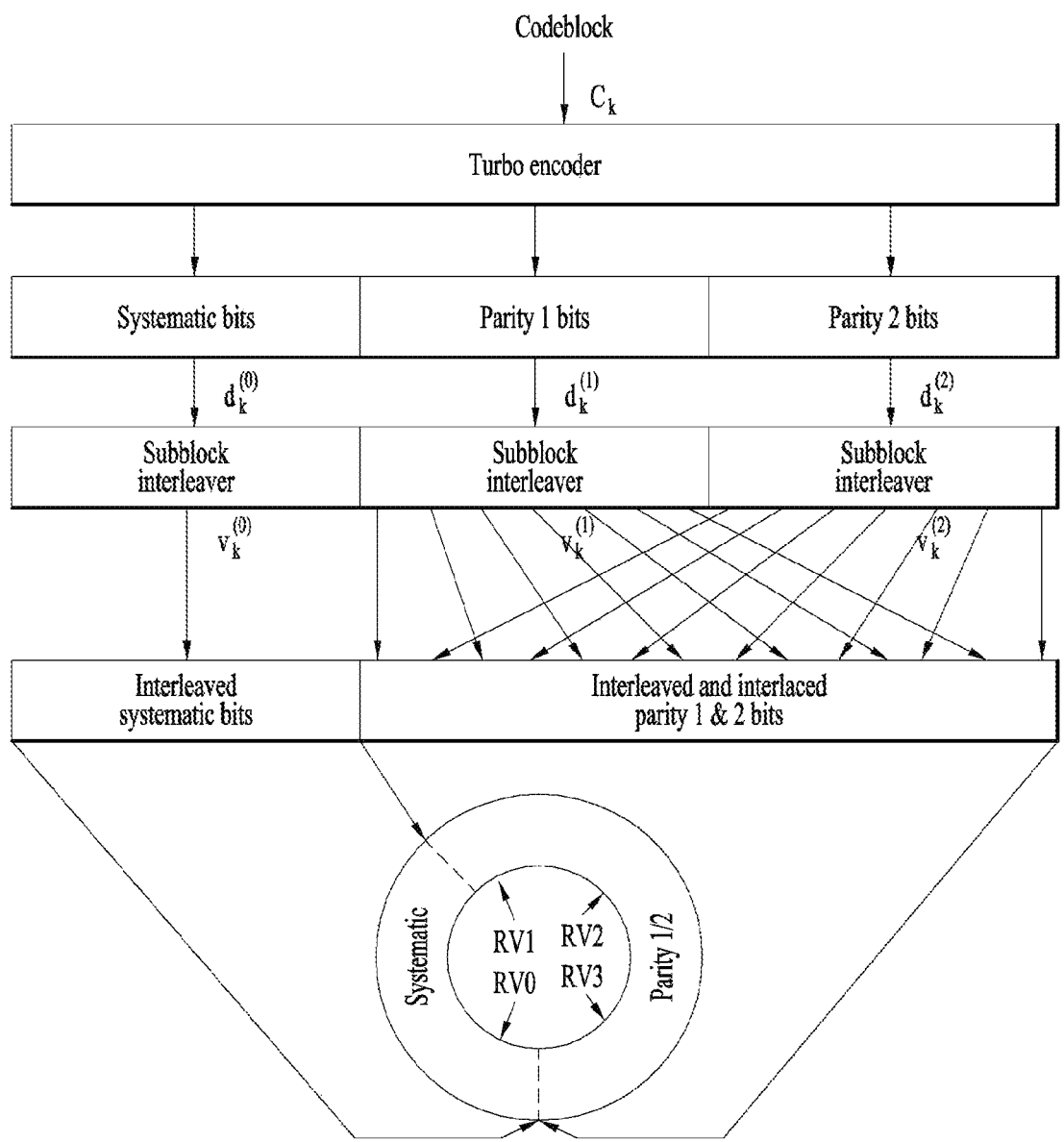
FIG. 2 is a block diagram illustrating rate matching performed by separating an encoded code block into a systematic part and a parity part.

FIG. 2 is a block diagram illustrating rate matching performed by separating an encoded code block into a systematic part and a parity part.

As illustrated in FIG. 2, the mother code rate of an LTE/LTE-A turbo encoder is 1/3. In order to obtain other code rates, if necessary, repetition or puncturing has to be performed, which are performed by a rate matching module. The rate matching module consists of three so-called sub-block interleavers for three output streams of the turbo encoder and a bit selection and pruning part, which is realized by a circular buffer. The sub-block interleaver is based on a classic row-column interleaver with 32 rows and length-32 intra-column permutation. The bits of each of the three streams are written row-by-row into a matrix with 32 columns (number of rows depends on stream size). Dummy bits are padded to the front of each stream to completely fill the matrix. After column permutation, bits are read out from the matrix column-by-column.

Figure 3:
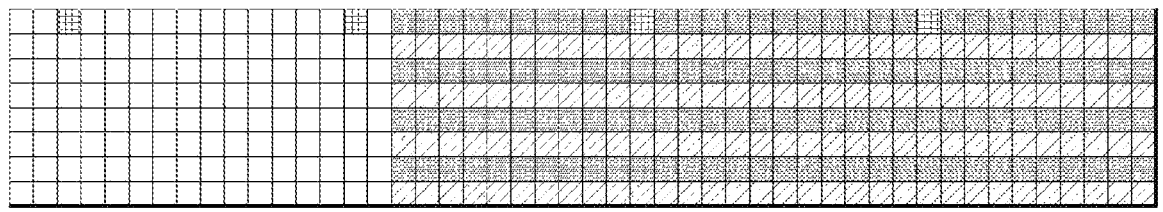
FIG. 3 illustrates an internal structure of a circular buffer.

FIG. 3 illustrates an internal structure of a circular buffer.

The circular buffer is the most important part of the rate matching module, making it possible to perform puncturing and repetition of a mother code. Referring to FIG. 2, the interleaved systematic bits are written into the circular buffer in sequence, with the first bit of the interleaved systematic bit stream at the beginning of the buffer. The interleaved and interlaced parity bit streams are written into the buffer in sequence, with the first bit of the stream next to the last bit of the interleaved systematic bit stream. Coded bits (depending on code rate) are read out serially from a certain starting point specified by redundancy version (RV) points in the circular buffer. If the coded bits reaches the end of the circular buffer and more coded bits are needed for transmission (in the case of a code rate smaller than 1/3), a transmitting device wraps around and continues at the beginning of the circular buffer.

HARQ, which stands for Hybrid ARQ, is an error correction mechanism based on retransmission of packets, which are detected with errors. The transmitted packet arrives at a receiving device after a certain propagation delay. The receiving device produces ACK for the case of error-free transmission or NACK for the case of detection of some errors. ACK/NACK is produced after some processing time and sent back to the transmitting device and arrives at the transmitting device after a propagation delay. In the case of NACK, after a certain processing delay in the transmitting device, a desired packet will be sent again. Bits, which are read out from the circular buffer and sent through retransmission, are different and depend on the position of the RV. There are four RVs (0, 1, 2, and 3), which define the position of a starting point at which the bits are read out from the circular buffer. Referring to FIG. 3, with the progressing number of retransmissions, the RV becomes higher and therefore fewer systematic bits and more parity bits are read out from the circular buffer for retransmission.

Using a channel code is essential in a broadcasting system as well as a communication system such as an LTE system. If the channel code is used, a transmitting side performs encoding upon an input symbol through an encoder and transmits the encoded symbol, and a receiving side performs decoding upon the encoded symbol to restore the input symbol. In this case, the size of the input symbol and the size of the encoded symbol are differently applied according to an applied system. For example, in a turbo code for data information used in 3GPP LTE, the size of the input symbol is a maximum of 6144 bits and the size of the encoded symbol is a maximum of 18432 (=6144*3).

Figure 4:
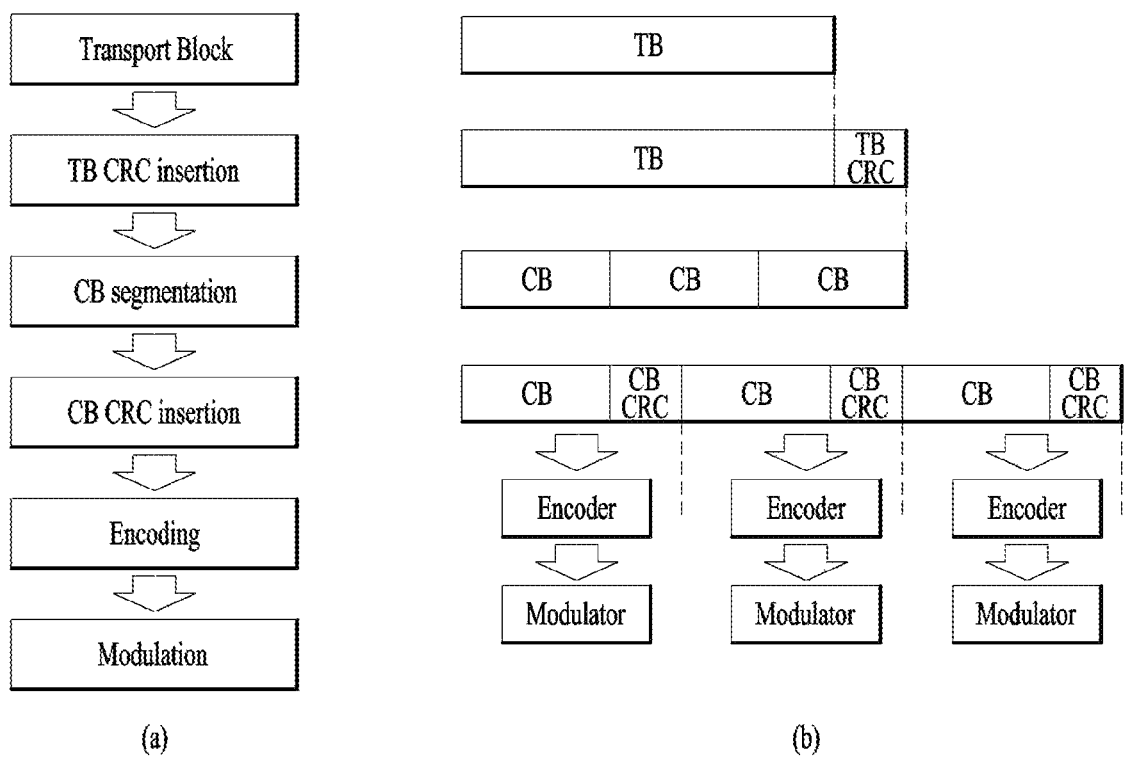
FIG. 4 illustrates a coding chain in an LTE/LTE-A system.

FIG. 4 illustrates a coding chain in an LTE/LTE-A system. FIG. 4 is illustrated to explain in more detail a processing procedure of the transport block described with reference to FIG. 1.

The size of a symbol input to an encoder (e.g., a turbo encoder) may differ from the size of a transport block (TB) from a medium access control (MAC) layer. If the TB is larger than a maximum size of the input symbol of the turbo code, the TB is segmented into several code blocks (CBs). In this case, the size of a CB becomes a maximum of '6144—CRC size'. The input symbol of the turbo code corresponds to data including a CB and a CRC or including a TB (≤6144 bits) and a CRC (a maximum of 24 bits). Output symbol(s) of the encoder are modulated into a modulation symbol by a modulator after being subjected to rate matching and CB concatenation. For a channel coding procedure of the LTE/LTE-A system, reference may be made to 3GPP TS 36.212.

A decoding procedure of the channel code is a reverse process of FIG. 4 and a decoder corresponding to each encoder of a transmitting device is used in the decoding procedure performed in a receiving device. The receiving device performs decoding upon each CB, configures a TB, and finally confirms whether the TB has passed a TB CRC. In a current LTE/LTE-A system, a CB CRC is used for fast decoding termination. For example, if the CB CRC has failed, the receiving device may generate NACK without decoding other CBs.

Various methods have been proposed to improve HARQ for more efficient and more robust communication against errors. For example, US 2009/0313516 discloses an enhanced HARQ method for LTE. According to the HARQ method, if the receiving device determines that a received CB is NACK as a result of performing a CB CRC upon the received CB, the receiving device transmits an index of the CB to the transmitting device to request retransmission of only the corresponding CB part. This method, however, is disadvantageous in that CB indexes which are fed back increase as the number of CBs increases.

In the LTE/LTE system, in the case of an FDD mode, the receiving device transmits, in a subframe i+4, an ACK/NACK signal indicating whether transmission of a TB received in a subframe i is successful or not and the transmitting device uses the subframe i+4 when it is desired to retransmit a signal based on the ACK/NACK signal. This is because a time required to process the TB and a time required to generate ACK/NACK, i.e., processing times, are considered. Among the processing times, the most time is consumed to process a channel code. In a TDD mode, different transmission times are used according to TDD UL/DL subframe configuration in consideration of times consumed to process the TB and generate ACK/NACK and UL subframe allocation. An ACK/NACK bundling and/or ACK/NACK multiplexing scheme is used according to the number of subframes and/or the number of cells, which are associated with ACK/NACK information.

NR provides higher speeds and better coverage than current 4G. NR operates in a high frequency band and is required to offer speeds of up to 1 Gb/s for tens of connections or tens of Mb/s for tens of thousands of connections. To meet requirements of such an NR system, introduction of a more evolved coding scheme than a legacy coding scheme is under discussion. Since data communication arises in an incomplete channel environment, channel coding plays an important role in achieving a higher data rate for fast and error-free communication. A selected channel code needs to provide superior block error ratio (BLER) performance for block lengths and code rates of a specific range. Herein, BLER is defined as the ratio of the number of erroneous received blocks to the total number of sent blocks. In NR, low calculation complexity, low latency, low cost, and higher flexibility are demanded for a coding scheme. Furthermore, reduced energy per bit and improved region efficiency are needed to support a higher data rate. Use examples for NR networks are enhanced mobile broadband (eMBB), massive Internet of things (IoT), and ultra-reliable and low latency communication (URLLC). eMBB covers Internet access with high data rates to enable rich media applications, cloud storage and applications, and augmented reality for entertainment. Massive IoT applications include dense sensor networks for smart homes/buildings, remote health monitoring, and logistics tracking. URLLC covers critical applications that demand ultra-high reliability and low latency, such as industrial automation, driverless vehicles, remote surgery, and smart grids.

Although many coding schemes with high capacity performance at large block lengths are available, many of these coding schemes do not consistently exhibit excellent good performance in a wide range of block lengths and code rates. However, turbo codes, low-density parity check (LPDC) codes, and polar codes show promising BLER performance in a wide range of coding rates and code lengths and hence are considered to be used in the NR system. As demand for various cases such as eMBB, massive IoT, and URLLC has increased, a coding scheme providing greater channel coding efficiency than in turbo codes is needed. In addition, increase in a maximum number of subscribers capable of being accommodated by a channel, i.e., increase in capacity, has been required.

LDPC codes were proposed by Gallager in 1962 as linear block codes, which are low density because most elements of a parity check matrix H are 0. Since the LDPC codes are very complicated such that it was impossible to implement the LDPC codes using technology of the time when the proposal was made, the LDPC codes were forgotten. In 1995, LDPC codes were rediscovered and extensive research thereinto has been carried out since performance thereof was proven (references: [1] Robert G. Gallager, "Low-Density Parity-Check Codes", The MIT Press, Sep. 15, 1963. [2] D. J. C. Mackay, Good error-correcting codes based on very sparse matrices, IEEE Trans. Inform. Theory, IT-45, pp. 399-431 (1999)). Current LDPC codes have mainly been used in 802.11n (refer to 'IEEE P802.11n=D10: 'Draft IEEE Standard for Local Metropolitan networks—Specific requirements. Part 11: Wireless LAN Medium Access Control (MAC), and Physical Layer (PHY) specifications: Enhancements for Higher Throughput', March 2006.'), 802.11ac, or digital video broadcasting (DBV). Generally, in standards to which LDPC is applied (e.g., DVB standard), encoding is performed using a parity check matrix instead of a generator matrix.

The parity check matrix of the LDPC code has a very small number of is so that the LDPC code may be decoded through iterative decoding even in a very large block size. If a block size significantly increases, the LDPC exhibits performance approximating to Shannon's channel capacity limit like a turbo code. The number of is included in a row or a column of the parity check matrix is referred to as a weight.

The LDPC code may be explained by an (n–k)*n parity check matrix H. A generator matrix G corresponding to the parity check matrix H may be obtained by the following equation.

$$H \cdot G = 0 \qquad \text{Equation 1}$$

$$C = G \cdot x \qquad \text{Equation 2}$$

Herein, c is a codeword and x is an information bit.

The decoder of the receiving device should acquire the information bit x from the codeword c, which is a result of encoding performed by the transmitting device, and the property of Hc=0 is used to obtain the information bit x. That is, if a received codeword is c' and a result of calculating the value of Hc' is 0, front k bits of c' are determined to be decoded information bits. If the value of Hc' is not 0, the information bit x is restored by searching for c' satisfying the value of Hc' being 0, using a sum-product algorithm through a graph, a belief propagation algorithm, etc. The inspection equation of Hc'=0 may be changed to $c'H^{T1}=0$ according to the relationship between the information bit and the generator matrix G. Therefore, the inspection equation may vary with the relationship between the information bit and the generator matrix G.

Figure 5:
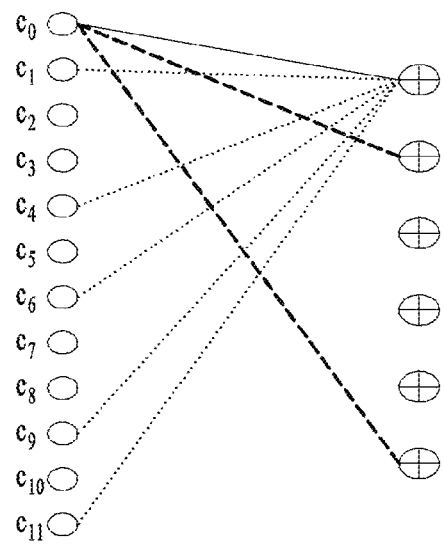
FIGS. 5 and 6 illustrate a parity check matrix H of an LDPC code through a bipartite graph.
Figure 6:
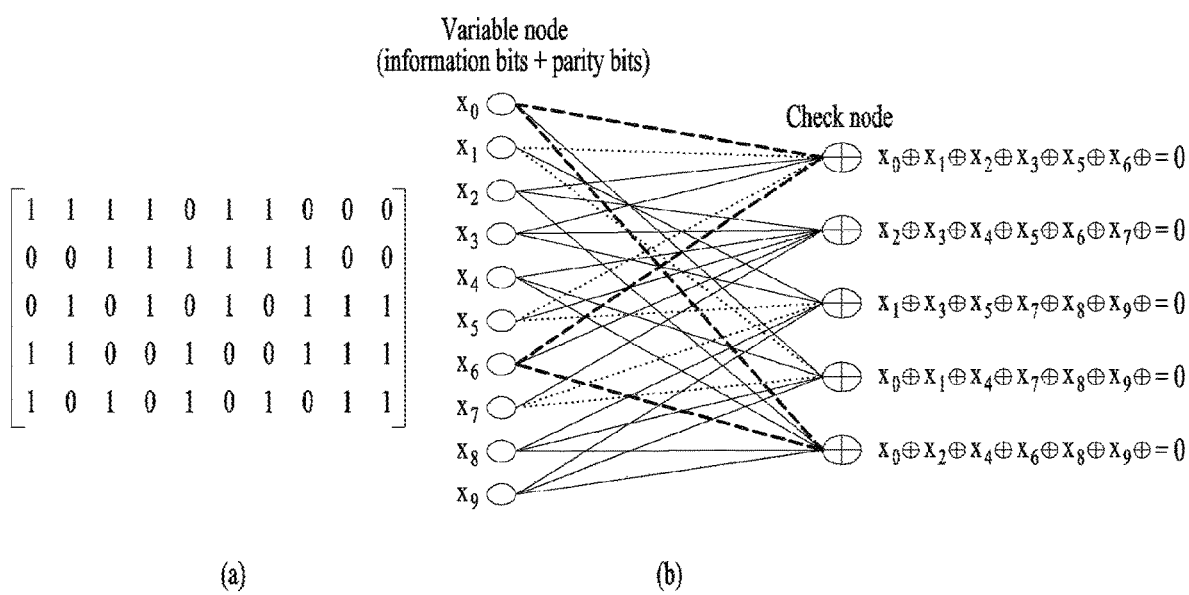

FIGS. 5 and 6 are illustrated to explain a parity check matrix H of an LDPC code through a bipartite graph.

'1' in a row of the parity check matrix illustrated in FIG. 5(a) represents an edge connected to a check node in the bipartite graph and '1' in a column of the parity check matrix represents an edge connected to a variable node. FIG. 5(b) illustrates a part of the bipartite graph corresponding to the parity check matrix illustrated in FIG. 5(a). Referring to FIG. 5(b), in the bipartite graph, the left nodes represent variable nodes and the right nodes represent check nodes.

FIG. 6 illustrates another parity check matrix and all bipartite lines.

Referring to FIG. 6, since the product of a parity check matrix H and a codeword c' should be '0', in any one check node, the sum of values of a hard decision result of variable nodes connected to the check node should be '0'. In FIG. 6(a), equations for hard decision for respective check nodes are given. In this way, in a check node, checking whether the sum of the variable node(s) connected to the check node is '0' is referred to as a syndrome check.

An 802.11n-based LDPC is one of candidate coding techniques considered for use in 5G because such an LDPC has been verified by many users using Wi-Fi. Since the 802.11n-based LDPC is small in a maximum input data size and a maximum codeword size relative to an LTE turbo code, the 802.11n-based LDPC generates more CBs for the same TB size as compared with the turbo code. In this case, in channel coding of LTE/LTE-A, a CRC is attached, i.e., inserted, to every CB. If the LDPC is applied to channel coding of LTE/LTE-A, CRC overhead increases due to an increase in the number of CBs relative to the turbo code. Therefore, the present invention proposes a method of reducing use of a CB CRC by checking an error of a CB through a syndrome check. Particularly, the present invention proposes a method of solving or reducing a problem that occurs when checking an error in a CB through the syndrome check using the characteristics of an LDPC code itself instead of using the CB CRC.

Figure 7:
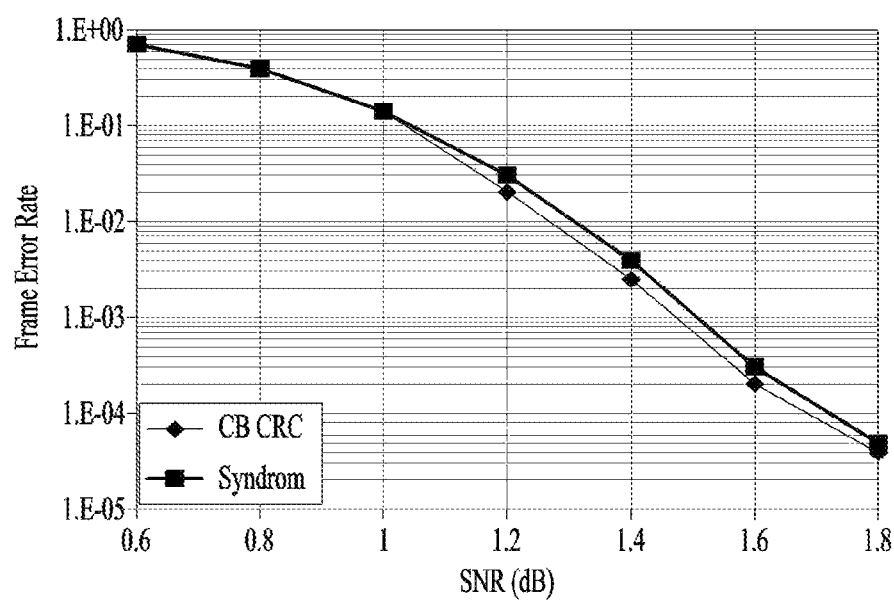
FIG. 7 illustrates the difference in error detection performance between a syndrome check and a cyclic redundancy check (CRC).

FIG. 7 illustrates the difference in error detection performance between a syndrome check and a CRC. In particular, FIG. 7 illustrates comparison between performance when the CRC is used and performance when the syndrome check is used, with respect to an 802.11n LDPC code, a code rate of which is 1/2 and a codeword size of which is 1944.

Since the syndrome check is low in error detection probability relative to the CRC, the case may occur in which an error is detected in a TB CRC although it has been confirmed that there is no error through the syndrome check. On the contrary, when an error is detected through the syndrome check, a probability of detecting an error in the TB CRC is 100%. Even in a situation in which the CB CRC is used in the LTE/LTE-A system, the case in which an error is detected in the TB CRC after no error is confirmed through the CB CRC may occur. However, since a polynomial of the CB CRC is different from a polynomial of the TB CRC (refer to 3GPP TS 36.212), the error detection probability using the CRC is better than that using the syndrome check. Therefore, the syndrome check is used instead of the CB CRC, a probability of mismatch between a result of the syndrome check and a result of the TB CRC is higher than a probability of mismatch between a result of the CB CRC and a result of the TB CRC.

Referring to FIG. 7, use of the syndrome check causes performance degradation of about 0.04 dB in a region in which a signal-to-noise ratio (SNR) is high and a difference in a frame error rate (FER) of about 20 to 30% in the same region in which the SNR is high.

In the present invention, a channel coding chain may be determined in consideration of overhead reduction gain and performance degradation caused by use of the syndrome check. The present invention may determine whether to use the syndrome check in the following cases.

Case a. When Channel Estimation Enhancement is Required

The syndrome check is used to reduce overhead so that transmission power used for signal transmission in the transmitting device may be reduced. Alternatively, a new RS may be inserted into a position at which overhead is reduced, thereby causing the receiving device to perform fast channel estimation.

Case b. Transmission in mmWave Band

Since an mmWave band (e.g., a band of 6 GHz or above) is sensitive to movement of a user, a variation width of a received SNR or signal-to-interference-plus-noise ratio (SINR) may be greater than an LTE/LTE-A band (e.g., a band of 2 GHz). Therefore, since performance reduction width caused by use of the syndrome check in the mmWave band may be relatively smaller than that in the LTE/LTE-A band, the syndrome check may be used in the mmWave band.

Case c. Small TB Transmission

In LTE/LTE-A, the smallest TB is 40 bits. However, since a CRC uses 24 bits, overhead caused by the CRC is 24/(40+24), which is about 1/3. Accordingly, the syndrome check may be used instead of the CRC with respect to a TB of a predetermined size or less in order to reduce overhead.

Figure 8:
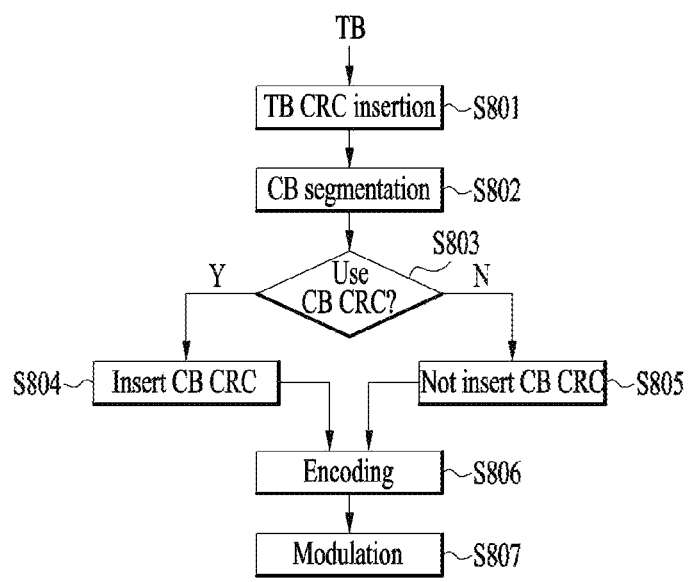
FIG. 8 illustrates a coding chain considering use of a CRC and a syndrome check according to the present invention.

FIG. 8 illustrates a coding chain considering use of a CRC and a syndrome check according to the present invention.

The transmitting device attaches a TB CRC code to a TB to generate a TB CRC-attached TB (S801). The transmitting device segments the TB CRC-attached TB into a plurality of CBs (S802) (when the TB CRC-attached TB exceeds a specific maximum size capable of being encoded by the encoder) The transmitting device may determine whether to attach a CB CRC code to each of the plural CBs so that the decoder of the receiving device may perform a CRC upon a CB or to cause the decoder to perform the syndrome check upon the CB without adding the CB CRC (S803), according to Case 1, Case 2, and/or Case 3. If the receiving device performs the CRC, the transmitting device attaches the CB CRC to each of the plural CBs (S804) and encodes each CB CRC-attached CB through the encoder (S806). If the receiving device performs the syndrome check instead of the CRC, the transmitting device does not attach the CB CRC (S805) and encodes each of the plural CBs through the encoder (S806). The transmitting device modulates output bits of the encoder through a modulator (S807) to generate modulation symbol(s). In the case of DL, the transmitting device corresponds to a BS and the receiving device corresponds to a UE. In the case of UL, the transmitting device corresponds to the UE and the receiving device corresponds to the BS. In the case of DL, the BS corresponding to the transmitting device may determine whether to cause the decoder of the UE to perform the CRC or the syndrome check upon a DL CB. For example, if the transmitting device desires to cause the decoder of the UE to perform the syndrome check, instead of the CRC, upon the DL CB, the BS may transmit, to the UE, information indicating that the CB CRC is not attached to the DL CB or information indicating that the syndrome check is to be performed. Upon receiving the information indicating that the CB CRC is not attached to the DL CB, the decoder of the UE may perform the syndrome check, instead of the CRC, upon the DL CB. In the case of UL, although the UE corresponding to the transmitting device may determine whether to attach the CB CRC and transmit information indicating whether the CB CRC is attached to a UL CB to the BS, the BS corresponding to the receiving device may determine whether to attach the CB CRC to the UL CB and signal the information indicating whether the CB CRC is attached to the UE. For example, if the BS desires to perform the syndrome check instead of the CRC, the BS may instruct the UE not to attach the CB CRC. In this case, the UE may perform encoding without attaching the CB CRC to the UL CB obtained through segmentation.

Hereinafter, for convenience of description, a DL situation (BS transmission and UE reception) is assumed to describe the process of FIG. 8. The present invention may also be applied in a UL situation (UE transmission and BS reception). However, in the case of UL, the BS does not feed back a CQI index to the UE, scheduling for UL transmission is performed by the BS, and a modulation and coding scheme (MCS) used for UL transmission is signaled to the UE by the BS (refer to DCI formats in 3GPP TS 36.212).

In FIG. 8, the size of a CB in CB segmentation may vary with a used channel code. A CQI index, which is fed back, and new feedback information may be used in a process in which the BS determines to use the CRC and the syndrome check. Alternatively, the BS may determine whether to use the CRC or the syndrome check in consideration of transmission overhead. In this case, the BS may allocate and use one bit for a selection result for the CRC and the syndrome in a PDCCH, an EPDCCH, or a DCI format. For example, the BS may set the bit to 0 to indicate that the syndrome check is used and set the bit to 1 to indicate that the CRC is used. The bit may also indicate whether an additional RS is present. The new feedback information will be described below.

In the LTE/LTE-A system, the UE feeds back a CQI index and ACK/NACK to the BS according to a decoding result. In this case, when the TB CRC has failed, the UE may transmit, to the BS through the PUCCH or the UCI format, 1-bit information (e.g., 0: failure of the TB CRC due to failure of the syndrome check and 1: success of the syndrome check but failure of the TB CRC) indicating whether the TB CRC has failed due to failure of the syndrome check or the syndrome check is successful but the TB CRC has failed. Upon receiving '0', the BS may use the CQI index fed back from the UE as in the LTE/LTE-A system for scheduling the next transmission or retransmission based on the CQI index fed back from the UE. Upon receiving '1', the BS may use the CQI index fed back from the UE as in the LTE/LTE-A system or perform new transmission or retransmission using the same MCS index as an MCS index used for previous transmission without referring to the CQI index received from the UE. In LTE/LTE-A, MCS tables are defined as MCS values satisfying a spacing of 2 dB in a specific BLER. That is, in LTE-A, a granularity between MCS indexes is about 2 dB. In contrast, a difference in performance caused by use of the syndrome is about 0.04 dB, which is much smaller than the granularity between the MCS indexes. Therefore, upon receiving '1' indicating that the syndrome check is successful but the TB CRC has failed, the BS may not necessarily need to lower the MCS index.

In LTE/LTE-A, the CB CRC is used for early termination of a decoding procedure. However, as in the case in which the CB CRC functions to indicate whether a specific CB has failed, the syndrome check may also indicate whether decoding has failed or is successful according to whether a corresponding equation is satisfied. Therefore, even when a TB is segmented into several CBs, the syndrome check may be used to indicate a failed CB. As in LTE, even when an LDPC code is used, a CRC may be inserted into every codeword. Alternatively, one LDPC CB CRC code may be added to every size similar to the case in which a turbo code is used, e.g., to every maximum size of the CB (e.g., 6144 bits for LTE). In this case, the BS should inform the UE of information about a situation of CB CRC insertion. For example, the BS may use a 1-bit indicator and set the 1-bit indicator to 0 by default to indicate that one LDPC CB CRC code is inserted into every maximum CB size. Alternatively, the BS may set the 1-bit indicator to 1 to indicate that the LDPC CB CRC code is inserted into every CB. If an n-bit indicator (e.g., n>1) greater than 1 bit is used, the BS may inform the UE of a use spacing of the CB CRC by equally dividing the TB CRC-attached TB by $2^n$. Alternatively, the BS may inform the UE of a starting CB index and a last CB index for a partial region in which the CRC is needed, i.e., for some CBs among multiple CBs.

In an LTE or eMBB situation in which there is a slight difference in performance between the syndrome check and the CRC, for example, a target packet error rate (PER) is 10%, the syndrome check is used as default in order to reduce overhead. At a transmission timing when ultra-reliability is needed, for example, in a scenario such as URLLC, the CB CRC may be inserted into information to be transmitted through a channel in order to secure ultra-reliability for the channel.

Figure 9:
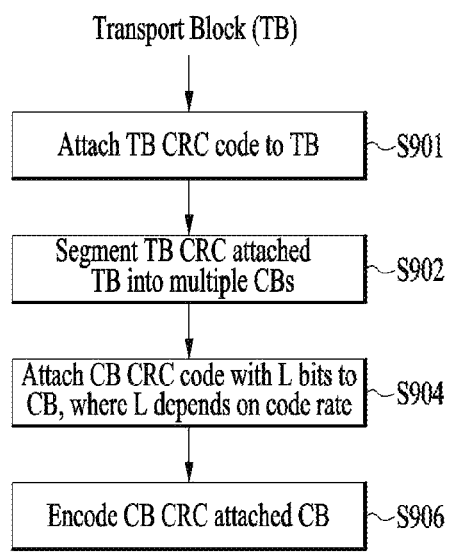
FIG. 9 illustrates CRC code insertion according to the present invention.

FIG. 9 illustrates CRC code insertion according to the present invention. The present invention described below may be implemented in conjunction with the present invention described with reference to FIG. 8. For example, when the present invention described below is implemented in conjunction with the present invention described with reference to FIG. 8, the present invention described below may be applied when the CB CRC is inserted. Alternatively, the present invention described below may be implemented separately from FIG. 8. For example, if CB segmentation is performed, the CB CRC may always be used and the CB CRC code may be added to the CB according to the present invention described below.

The transmitting device may attach a TB CRC to an information block, i.e., a TB (S901) and segment the CB CRC-attached TB into a plurality of CBs (S902).

The CB CRC may be inserted at a high code rate. The CB CRC may be inserted according to an MCS index in MCS tables (see Table 8.1.6.1-1 and Table 8.1.6.1-2 of 3GPP 36.213 for LTE/LTE-A and see tables corresponding to Table 8.1.6.1-1 and Table 8.1.6.1-2 of 3GPP 36.213 for NR). In this case, the length of the inserted CB CRC may differ according to the MCS index. That is, the length L of the CB CRC code attached to the CB in the invention may depend on an MCS level (particularly, a code rate). The CRC is an important factor affecting a false alarm rate (FAR) as well as BLER performance. For example, in LTE/LTE-A, a 24-bit CRC code, i.e., a 24-bit CRC sequence, has been used regardless of an MCS (see Section 5 of 3GPP TS 36.212). In the case of an LDPC, since a parity partially replaces a CRC function, a parity check and a reduced length of the CRC may be used together to maintain an FAR. As the number of parity check equations in an LDPC code increases and according to an edge pattern connected to the parity, BLER performance may differ. However, generally, when code rates are similar, BLER performance is similar even if the number of the parity check equations and the edge pattern differ. For example, when an input size K is 10 and a code rate R is 1/2, the number of parity check equations is 10, whereas, when K=100 and R=1/2, the number of parity check equations is 100. Although performance of the LDPC code may differ according to an input size, the difference in performance is slight (e.g., the difference between BLER when K=1000 and BLER when K=8000 is within about 0.5 dB) and there is a significant difference in BLER performance according to the code rate. Meanwhile, as the length of the CRC code increases, FAR performance becomes better. That is, as the absolute number of CRC check equations increases, FAR performance is improved. Therefore, a factor that most significantly affects the FAR is the length of the CRC code and the code rate of the LDPC code. Therefore, the present invention may vary the length of the CRC code according to code rate and may reflect the varied length of the CRC code in the MCS table. The present invention proposes that a relationship be satisfied such that the length of the CRC code is reduced (in the same modulation order) as the code rate is low, i.e., an MCS index is low. Therefore, in the present invention, the MCS index may serve to indicate information about the length of the CRC code as well as the modulation order and the code rate.

Referring to FIG. 9, if the CB CRC needs to be attached to the CB, the transmitting device may attach a CRC code having a size corresponding to the MCS index (or code rate) for the TB (S904). If the transmitting device is the BS, the MCS index or the code rate for the TB may be included in scheduling information (e.g., DL control information) for the TB and signaled to the UE. The BS may attach a CB CRC having a length corresponding to the MCS index or the code rate signaled to the UE to the corresponding CB and transmit the CB CRC-attached CB to the UE. If the transmitting device is the UE, the UE may receive information indicating an MCS index or a code rate for the corresponding UL transmission from the BS and attach a CB CRC having a length based on the information to the CB. The CB CRC-attached CB obtained by attaching the CB CRC code is encoded by the encoder of the transmitting device (S906). The encoded CB is modulated and transmitted to the receiving device through radio resources. The receiving device obtains the CB CRC-attached CB(s) from a received signal through demodulation. The decoder of the receiving device may perform the CRC upon the CB using the CB CRC code of a length L under the assumption that the CB CRC code of the length L corresponding to the MCS or coding rate for the TB has been attached.

In retransmission, a CRC length, i.e., the length of the CRC code, should be fixed even if the MCS index is changed. From the viewpoint of input of the LDPC code, a CRC corresponds to information, and the code rate and the modulation order are not a factor that changes input information during retransmission. Therefore, upon receiving a retransmission request, although the transmitting device may change the code rate and the modulation order according to the MCS index, the length of the CRC may be fixed to support incremental redundancy (IR) or chase combining (CC) retransmission. In addition, the length of the CRC may be adjusted according to an information block size, a coded bit size, and a modulation order.

In legacy channel coding, if a CB having a smaller size than other CBs occurs by SB segmentation, zero padding (e.g., "filler bits" in Section 5.1.2 of 3GPP TS 36.212) has been performed with respect to the small CB. In the present invention, a flexible CRC may be used instead of performing zero padding. For example, in the present invention, when a modulation order is m, an information block size is K, a code rate is R, and a codeword size is N=K*1/R, if N % m=0, N'_min CRC bit(s) may be added to generate a codeword of a size N. N '>N and N'_min is the smallest natural number satisfying N'% m=0. In this case, there is an advantage of lowering a false alarm probability as well as a BLER due to the added CRC bits. For reference, % in N % m denotes a modulus or a remainder operator for returning a remainder obtained by dividing N by m.

Figure 10:
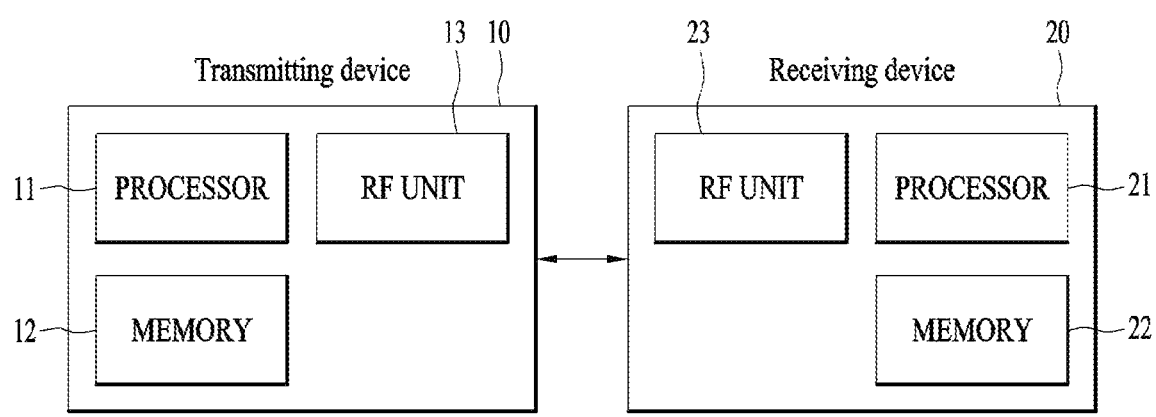
FIG. 10 is a block diagram illustrating elements of a transmitting device 10 and a receiving device 20 for implementing the present invention.

FIG. 10 is a block diagram illustrating elements of a transmitting device 10 and a receiving device 20 for implementing the present invention.

The transmitting device 10 and the receiving device 20 respectively include radio frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described examples of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. A RF unit supporting a MIMO function of transmitting and receiving data using a plurality of antennas may be connected to two or more antennas.

The transmitting device 10 may be configured to include an encoder according to the present invention and the receiving device may be configured to include a decoder according to the present invention. For example, the processor 11 of the transmitting device 10 may be configured to perform encoding according to the present invention and the processor 21 of the receiving device 20 may be configured to perform decoding according to the present invention. That is, the encoder according to the present invention may be configured as a part of the processor 11 of the transmitting device 10 and the decoder according to the present invention may be configured as a part of the processor 21 of the receiving device 20.

As described above, the detailed description of the preferred implementation examples of the present invention has been given to enable those skilled in the art to implement and practice the invention. Although the invention has been described with reference to exemplary examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

Examples of the present invention may be used for a processing chip connected to or mounted in a BS, a UE, or a communication device in a wireless communication system, or for other equipment.

The invention claimed is:

1. A method of transmitting a transport block (TB) by a transmitting device in a wireless communication system, the method comprising:

attaching a TB CRC code to the TB to produce a TB CRC-attached TB;

segmenting the TB CRC-attached TB to produce a plurality of code blocks (CBs);

determining whether to attach a code block (CB) cyclic redundancy check (CRC) code to each of the plurality of CBs;

based on a determination of attaching the CB CRC code to each of the plurality of CBs:

attaching the CB CRC code to each of the plurality of CBs to produce a plurality of CB CRC-attached CBs, and encoding each of the plurality of CB CRC-attached CBs based on a low-density parity check (LDPC) code;

based on a determination of not attaching the CB CRC code to each of the plurality of CBs, encoding each of the plurality of CBs having no CB CRC code based on the LDPC code; and transmitting the encoded CBs to a receiving device.

2. The method of claim 1, wherein a length of the CB CRC code depends on a code rate for the TB, and the method further comprising:

transmitting code rate information regarding the code rate to the receiving device.

3. The method of claim 2, wherein the code rate information is a modulation and coding scheme (MCS) index.

4. The method of claim 2, wherein the length of the CB CRC code is small as the code rate is low.

5. A transmitting device for transmitting a transport block (TB) in a wireless communication system, the transmitting device comprising, a transmitter/receiver;

at least one processor; and at least one computer memory operably connectable to the at least one processor and storing instructions that, when executed, cause the at least one processor to perform operations comprising:

attaching a TB CRC code to the TB to produce a TB CRC-attached TB;

segmenting the TB CRC-attached TB to produce a plurality of code blocks (CBs);

determining whether to attach a code block (CB) cyclic redundancy check (CRC) code to each of the plurality of CBs;

based on a determination of attaching the CB CRC code to each of the plurality of CBs:

attaching the CB CRC code to each of the plurality of CBs to produce a plurality of CB CRC-attached CBs, and encoding each of the plurality of CB CRC-attached CBs based on a low-density parity check (LDPC) code;

based on a determination of not attaching the CB CRC code to each of the plurality of CBs, encoding each of the plurality of CBs having no CB CRC code based on the LDPC code; and transmitting, via the transmitter/receiver, the encoded CBs to a receiving device.

6. The transmitting device of claim 5, wherein a length of the CB CRC code depends on a code rate for the TB, and the operations further comprise:

controlling the transmitter/receiver to transmit code rate information regarding the code rate to the receiving device.

7. The transmitting device of claim 6, wherein the code rate information is a modulation and coding scheme (MCS) index.

8. The transmitting device of claim 6, wherein the length of the CB CRC code is small as the code rate is low.

* * * * *